(12) United States Patent
Bowden

(10) Patent No.: US 9,249,004 B2
(45) Date of Patent: Feb. 2, 2016

(54) LOAD MONITORING SYSTEM

(71) Applicant: Niftylift Limited, Milton Keynes (GB)

(72) Inventor: Frank Roger Bowden, Totternhoe (GB)

(73) Assignee: NIFTYLIFT LIMITED, Milton Keynes (GB)

(*) Notice: Subject to any disclaimer, the term of this patent is extended or adjusted under 35 U.S.C. 154(b) by 182 days.

(21) Appl. No.: 13/893,618

(22) Filed: May 14, 2013

(65) Prior Publication Data

US 2013/0253776 A1 Sep. 26, 2013

Related U.S. Application Data

(62) Division of application No. 12/665,026, filed as application No. PCT/GB2006/002110 on Jun. 20, 2008, now abandoned.

(30) Foreign Application Priority Data

Jun. 21, 2007 (GB) .................................. 0711960.5

(51) Int. Cl.
*B66F 17/00* (2006.01)
*B66F 11/04* (2006.01)
*G01G 3/145* (2006.01)

(52) U.S. Cl.
CPC ............. *B66F 17/006* (2013.01); *B66F 11/046* (2013.01); *G01G 3/145* (2013.01)

(58) Field of Classification Search
CPC ........ B66F 11/00; B66F 11/04; B66F 11/042; B66F 11/046; B66F 17/006
See application file for complete search history.

(56) References Cited

U.S. PATENT DOCUMENTS

| | | | | |
|---|---|---|---|---|
| 2,786,669 | A | * | 3/1957 | Safford et al. ................. 177/211 |
| 2,927,292 | A | * | 3/1960 | Critchley et al. .................. 338/3 |
| 3,692,129 | A | * | 9/1972 | Pratt et al. ...................... 177/211 |
| 3,724,720 | A | * | 4/1973 | Bullivant ......................... 222/55 |
| 4,461,182 | A | | 7/1984 | Jones et al. |
| 4,696,359 | A | | 9/1987 | Glibbery |
| 5,296,655 | A | | 3/1994 | Sargent et al. |
| 5,934,409 | A | | 8/1999 | Citron et al. |
| 6,405,114 | B1 | | 6/2002 | Priestley et al. |
| 6,439,341 | B1 | | 8/2002 | Engvall et al. |
| 8,584,800 | B2 | * | 11/2013 | Bowden .......................... 182/18 |
| 2003/0000757 | A1 | | 1/2003 | Ishida et al. |
| 2003/0174064 | A1 | | 9/2003 | Igarashi et al. |
| 2004/0262078 | A1 | | 12/2004 | Bailey |

FOREIGN PATENT DOCUMENTS

GB 1510291 A 5/1978
NL 1 023 556 C2 11/2004

OTHER PUBLICATIONS

Copy of the International Search report issued in corresponding PCT Application No. PCT/GB2008/002110, dated Oct. 15, 2008.
Copy of the UK Search report issued in corresponding Application No. GB0711960.5, dated Aug. 23, 2007.

* cited by examiner

*Primary Examiner* — Colleen M Chavchavadze
(74) *Attorney, Agent, or Firm* — Knobbe Martens Olson & Bear LLP

(57) ABSTRACT

A load monitoring system for a mobile work platform including a load cell having at least one strain gauge and a sensing circuit connected to receive a strain signal from the strain gauge. The sensing circuit includes a first sensing device for sensing the strain in the strain gauge, and a second sensing device for sensing a negative shift in the strain signal.

11 Claims, 3 Drawing Sheets

LOAD MONITORING SYSTEM

RELATED APPLICATIONS

This application is a divisional of U.S. application Ser. No. 12/665,026, filed Jan. 21, 2010, which is the U.S. National Phase filing under 35 U.S.C. §371 of PCT/GB2008/002110, filed Jun. 20, 2008, which designated the United States and was published in English, which claims priority under 35 U.S.C. §119(a)-(d) to Great Britain Patent Application No. 0711960.5, filed Jun. 21, 2007, the entire content of which is incorporated herein by reference.

FIELD OF THE INVENTION

The present invention relates to a load monitoring system for a mobile work platform and to a mobile work platform having a load monitoring system.

BACKGROUND OF THE INVENTION

Mobile work platforms typically include a cage or platform that is designed to receive one or more human operators. The cage is mounted on a lift mechanism, such as a hydraulic boom or a scissor lift mechanism, that allows its height to be adjusted. The mobile work platform also includes a wheeled or tracked chassis, which allows it to be moved easily to a desired location. Various types of mobile work platform are available, including self-propelled, self-drive, trailer and vehicle-mounted platforms.

A load monitoring system is generally included to provide cage overload protection. Cage overload protection is required on mobile elevating work platforms as defined by European standard EN280:2001 Amendment 1. European standard EN954 is cited by EN 280 and describes the requirements for safety switches in electrical systems providing overload protection. EN954 Category 3 requires that common mode faults resulting from damage to the protection system are taken into account, if the probability of such a fault occurring is significant.

One such fault may occur if the mechanical structure of the load protection system is damaged, causing the zero position of the load cell to shift in an unsafe direction. The resulting load measurement may then be inaccurate. There is currently no requirement for on-going calibration of load monitoring systems. It is thus possible for damage to the load monitoring system or the structure on which it is mounted to go undetected. This may allow the cage to be overloaded without triggering the protection system, causing the work platform to become unstable.

It is an object of the present invention to provide a mobile work platform and a load monitoring system for a mobile work platform that mitigate at least some of the aforesaid disadvantages. In particular, but not exclusively, the invention seeks to provide a detector within the load monitoring system for detecting any unsafe damage to the load monitoring system that may result in an unstable work platform.

SUMMARY OF THE INVENTION

According to one aspect of the present invention there is provided a load monitoring system for a mobile work platform, the system including a load cell having at least one strain gauge and a sensing circuit connected to receive a strain signal from the strain gauge, the sensing circuit including a first sensing device for sensing the load on the load cell and a second sensing device for sensing a negative shift in the unloaded strain signal.

The unloaded strain signal is the strain signal provided by the strain gauge when the cage of the mobile work platform is empty. A shift in the unloaded strain signal may occur when, for example, the load cell is damaged causing the zero position of the load cell to shift. A negative shift in the unloaded strain signal causes the load cell to sense less than the full weight of the cage, with the result that when the cage is empty the strain gauge indicates a negative load value.

The provision of a second sensing device that senses a negative shift in the unloaded strain signal ensures that any damage to the load cell that would cause it to detect less than the actual load in the cage is automatically detected. This prevents the load monitoring system from giving a false reading and ensures that the cage is not inadvertently overloaded. The safety of the mobile work platform is thus improved and the risk of accidents is reduced.

The strain gauge is preferably connected in a bridge circuit configuration, which preferably provides compensation for temperature variations.

Advantageously, the strain gauge is connected to an amplifier that is constructed and arranged to amplify the strain signal.

The first sensing device may be a first comparator. Advantageously, the first comparator has a first input terminal connected to receive a load signal that represents the strain in the strain gauge, a second input terminal connected to receive a load reference signal, and an output terminal for an overload signal that is generated when the load signal exceeds the load reference signal. The load reference signal may be adjustable, allowing the required load limit to be selected.

Advantageously, the output signal of the first comparator is connected to a safety device that is constructed and arranged for activation by said overload signal, thereby informing the operator of a potentially hazardous overload situation and allowing remedial action to be taken. The safety device may for example be an alarm and/or an automatic cut-out device.

The second sensing device may be a second comparator. Advantageously, the second comparator has a first input terminal connected to receive a load signal that represents the strain in the strain gauge, a second input terminal connected to receive a second reference signal, and an output terminal for a negative shift signal that is generated when the load signal is less than the second reference signal. The second reference signal may be adjustable, allowing an acceptable limit of negative shift in the unloaded strain signal to be selected.

Advantageously, the output signal of the second comparator is connected to a safety device that is constructed and arranged for activation by said negative shift signal. Again, this informs the operator of the potentially hazardous situation, allowing suitable remedial action such as repairing or replacing the damaged load cell to be taken. The safety device may for example be an alarm and/or an automatic cut-out device.

The system preferably includes at least two strain gauges, each being connected to a respective load sensing circuit, wherein the load sensing circuits are constructed and arranged to operate in parallel. This ensures that the monitoring system operates correctly even if one of the circuits is faulty, thus increasing safety.

According to a further aspect of the invention there is provided a mobile work platform that includes an operator platform, a base and a lift mechanism for lifting the operator platform relative to the base, and a load monitoring system according to any one of the preceding statements of invention for monitoring the load on the operator platform.

Advantageously, the load cell of the load monitoring system is connected between the lift mechanism and the operator platform.

BRIEF DESCRIPTION OF THE DRAWINGS

An embodiment of the invention will now be described by way of example, with reference to the accompanying drawings, in which.

DETAILED DESCRIPTION OF THE PREFERRED EMBODIMENT

Figure 1:
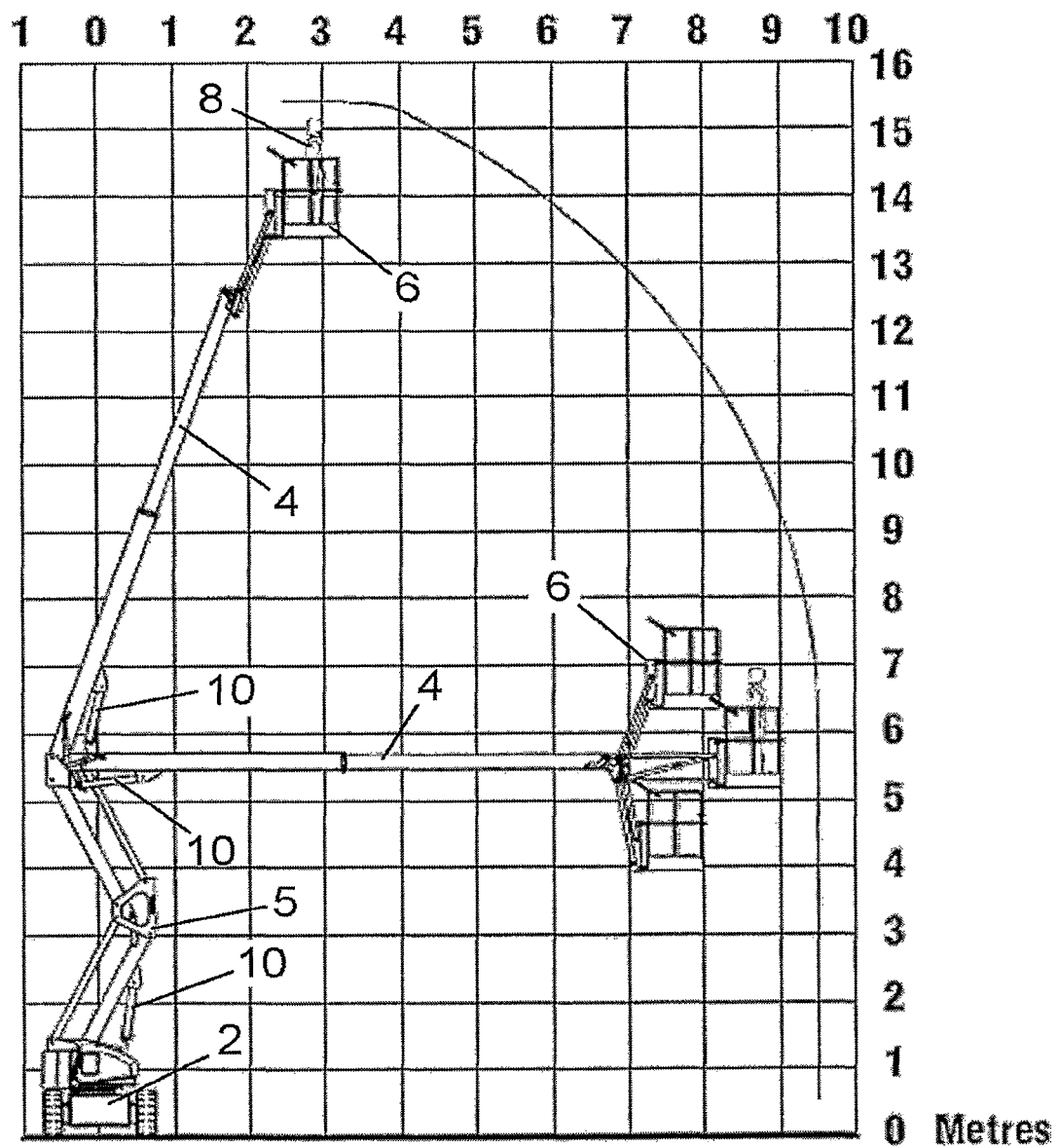
FIG. 1 is a front elevation of a mobile work platform according to an embodiment of the invention, in various operating configurations.

FIG. 1 shows a typical mobile work platform according to an embodiment of the invention, which includes a wheeled base unit 2, a hydraulically operated lift mechanism comprising a boom 4 and a lifting structure 5, and a platform (or cage) 6 for a human operator 8. The boom 4, which is shown here in various operating configurations, may be retracted and folded onto the base unit 2 for transportation or storage. Movement of the boom 4 is controlled by various hydraulic cylinders 10, which are connected by hydraulic hoses (not shown) to a hydraulic drive system. Hydraulic motors may also be provided for driving the wheels. The components shown in FIG. 1 are all conventional and will not therefore be described in detail. It should be understood that the mobile work platform may take various alternative forms.

Figure 2:
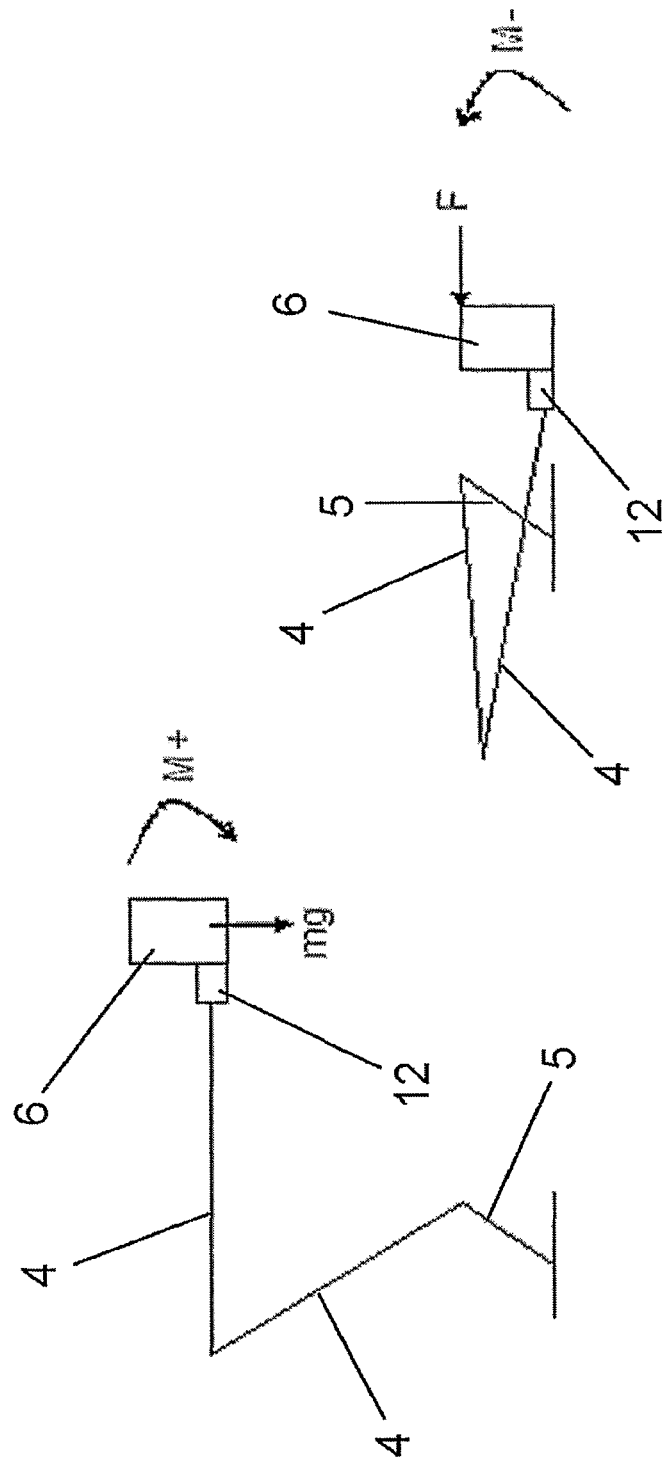
FIGS. 2a and 2b are schematic side views of a mobile work platform load, illustrating in FIG. 2a a normal operating condition and in FIG. 2b a possible failure condition.
Figure 3:
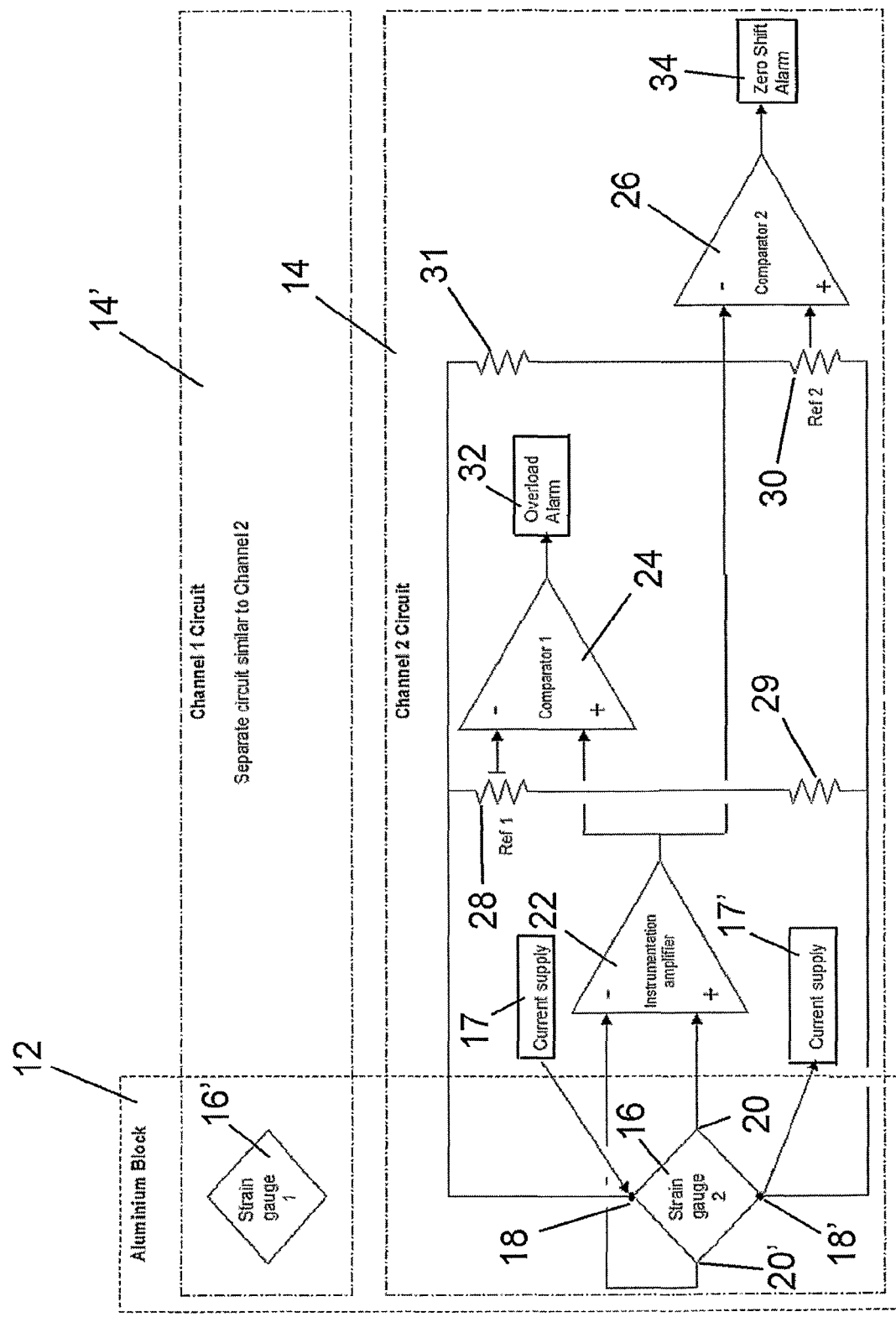
FIG. 3 is a circuit diagram of a load monitoring system according to an embodiment of the invention.

As shown schematically in FIGS. 2a and 2b, the cage 6 is connected to the boom 4 via a load cell 12. The load cell 12 is conventional in design and comprises an aluminium block that acts as a cantilever spring and carries one or more strain gauges, preferably of the resistive foil type. The strain gauges are connected to a load monitoring system 14, for example as illustrated in FIG. 3.

During normal use as shown in FIG. 2a, the load cell 12 supports a downwards load mg equal to the mass m of the cage and its contents multiplied by gravity g. It therefore experiences a positive moment M+ (shown as clockwise in the drawing). The strain in the load cell produced by this moment is measured by the strain gauges and used to calculate the load in the cage. If the load exceeds a predetermined limit, the load monitoring system 14 sounds an alarm to warn the user and/or activates a cut-out device to prevent further operation of the platform.

Under certain circumstances, it is possible for the cage to experience a force that results in a negative moment being applied to the load cell 12. For example, as illustrated in FIG. 2b, if the mobile work platform is accidentally pushed or driven backwards into an obstruction, a force F may be applied to the cage 6, producing a negative moment M− on the load cell 12. If this negative moment exceeds the elastic limit of the load cell it may be permanently deformed. This may affect the zero condition of the strain gauges, such that they read zero only when the cage 6 is partially loaded. As a result, it may be possible to overload the cage without activating the safety system, creating a potentially dangerous situation.

For example, if the strain gauge experiences a shift in the zero position that causes it to indicate a load of −X kg when the cage is unloaded, then the cage overload alarm will not be activated until the cage carries a payload of (X+Y) kg, where Y kg is the normal safe working limit. By design, the machine may sustain a cage load of S.Y kg, where S is a design safety factor. The machine may therefore become unstable if (X+Y)>S.Y.

In the present invention, the load monitoring system 14 is designed to detect a negative strain signal resulting from a negative shift in the zero position of the strain gauge (that is, a shift that causes the strain gauge to indicate less than the true load carried in the cage). Such a shift may result for example from an excessive negative moment being applied to the system. Upon detecting a negative strain, the system is designed to activate an alarm system to warn the operator of the mobile work platform that there is a fault in the load detection system. A positive shift in the zero position (which causes the strain gauges to indicate more than the true cage load) is not detected, since this does not adversely affect the safety of the work platform.

The monitoring circuit of the load monitoring system 14 is illustrated in FIG. 3. In accordance with European safety legislation, the circuit has two channels 14,14', which are connected to separate strain gauges 16,16' and operate in parallel to ensure that failure of one channel or one strain gauge does not compromise the safety of the platform. Only one channel (channel 2) will be described in detail.

The other channel (channel 1) may be similar to channel 2, although compliance with legislation only requires that it detects an overload condition. It is not essential that channel 1 also detects a negative strain signal. Optionally, channel 1 may also be arranged to detect a pre-overload condition and provide an advisory signal when, for example, the load reaches 90% of the maximum safe working load. Such an arrangement is conventional and so will not be described in further detail.

The strain gauge 16 has a conventional full bridge configuration with four active legs. A constant voltage supply 17,17' is connected to a pair of input connections 18,18' at opposite corners of the bridge, while a pair of output connections 20,20' at the other corners of the bridge are connected to the inputs of an instrumentation amplifier 22, which detects the voltage across the output connections of the bridge. This bridge output voltage is determined by the strain in the load cell 12.

The output of the amplifier 22 is connected to the positive input terminal of a first comparator 24 and the negative input terminal of a second comparator 26. The negative input terminal of the first comparator 24 is connected to a first potentiometer 28, which is connected in series with a fixed resistor 29. The positive input terminal of the second comparator 26 is connected to a second potentiometer 30, which is connected in series with a second fixed resistor 31. The potential dividers created by the first potentiometer 28 and the first resistor 29, and by the second potentiometer 30 and the second resistor 31, are connected in parallel across the input terminals 18,18' of the strain gauge 16 and thus measure the voltage across the strain gauge bridge. Thus the measuring system is ratiometric and has first order independence from supply voltage variations. The first potentiometer 28 may be adjusted to control the input voltage at the negative input terminal of the first comparator 24, which represents the cage overload reference value. The second potentiometer 30 may be adjusted to control the input voltage at the positive input terminal of the second comparator 26, which represents the zero shift reference value. The output of the first comparator 24 is connected to an overload alarm device 32 and the output of the second comparator 26 is connected to zero shift alarm 34.

To calibrate the circuit for use, the second potentiometer 30 is adjusted while the cage is empty to set the zero shift reference. A known weight equal to the safe working limit of the platform is then placed in the cage 6 and the first potentiometer 28 is adjusted to set the cage overload reference.

During operation, the first comparator 24 compares the output voltage of the instrumentation amplifier 22 with the overload reference voltage provided by the first potentiometer 28. As the strain on the load cell 12 increases, the output voltage of the instrumentation amplifier 22 also increases. Providing that the amplifier output voltage is less than the reference voltage, the overload alarm 32 will remain silent. However, if the amplifier output voltage exceeds the reference voltage, the output state of the comparator 24 will change, triggering the overload alarm 32 and indicating that the cage is overloaded.

The second comparator 26 compares the output voltage of the instrumentation amplifier 22 with the zero shift reference voltage provided by the second potentiometer 30. Normally, under all positive load conditions, the amplifier output voltage is greater than the zero shift reference voltage and the zero shift alarm 34 remains silent. However, if the load cell 12 has suffered damage from a negative load causing deformation of the load cell, the amplifier output voltage for an unloaded cage will reduce to below the zero shift reference voltage provided by the second potentiometer 30. Should this occur, the output state of the second comparator 26 will change, triggering the zero shift alarm 34 and indicating that the load cell is operating incorrectly.

If either the cage overload limit (the supposed positive voltage) or the zero shift monitoring voltage (the supposed negative-going voltage) are outside the acceptable ranges, one of the comparators will change state, so generating an alarm. The monitoring system is able to detect both overloading of the cage and a situation in which, for example, an excessive negative load has been applied to the cage, causing deformation of the load cell and a negative shift in the zero position of the load monitoring system. This results in a more stable elevating work platform and improved safety. The system is not however designed to prevent an incorrect cage load measurement.

Various modifications of the load detection system are of course possible. For example, instead of providing an alarm, the system may be designed to actuate a cut-off device preventing operation of the mobile work platform, or a device that limits the boom operating speed to half of its normal value or that restricts its direction of travel. Alternatively, both an alarm and a cut-off device may be provided, possibly with different trigger points so that the alarm is activated at a lower level than the cut-off device. The detection circuit may also be constructed and arranged to use digital electronic devices as well as or instead of analogue circuit components.

What is claimed is:

1. A method for monitoring a load for a mobile work platform, comprising;
    producing a strain signal from at least one strain gauge included in a load cell;
    receiving said strain signal from the at least one strain gauge by a sensing circuit included in said load cell;
    sensing the load on the load cell;
    sensing a negative shift in an unloaded strain signal produced when said load cell is not loaded, wherein said negative shift is caused by damage to the load cell; and
    activating a safety device when the negative shift is sensed.

2. The method according to claim 1, wherein the strain gauge is connected in a bridge circuit configuration.

3. The method according to claim 1, wherein the strain gauge is connected to an amplifier that amplifies the strain signal.

4. The method according to claim 1, wherein the sensing circuit includes a first sensing device for sensing the load on the load cell.

5. The method according to claim 4, wherein the first sensing device is a first comparator.

6. The method according to claim 5, wherein the first comparator has a first input terminal connected to receive a load signal that represents the strain in the strain gauge, a second input terminal connected to receive a load reference signal, and an output terminal for an overload signal that is generated when the load signal exceeds the load reference signal.

7. The method according to claim 1, wherein the sensing circuit includes a second sensing device for sensing the negative shift in the strain signal.

8. The method according to claim 7, wherein the second sensing device is a second comparator.

9. The method according to claim 8, wherein the second comparator has a first input terminal connected to receive a load signal that represents the strain in the strain gauge, a second input terminal connected to receive a second reference signal, and an output terminal for a negative shift signal that is generated when the load signal is less than the second reference signal.

10. The method according to claim 9, wherein the output signal of the second comparator is connected to a safety device that is activated by said negative shift signal.

11. The method according to claim 1, wherein the system includes at least two strain gauges, each of which is connected to a respective load sensing circuit, wherein the load sensing circuits operate in parallel.

* * * * *